Dec. 12, 1950   V. A. ROACH   2,533,627
ENGINE SPEED CONTROL
Filed Nov. 18, 1946   2 Sheets-Sheet 1

INVENTOR
VERNON A. ROACH
BY Joseph B. Gardner
his atty.

Dec. 12, 1950  V. A. ROACH  2,533,627
ENGINE SPEED CONTROL
Filed Nov. 18, 1946  2 Sheets-Sheet 2

INVENTOR
VERNON A. ROACH
BY Joseph B. Gardner
his atty.

Patented Dec. 12, 1950

2,533,627

UNITED STATES PATENT OFFICE 2,533,627

ENGINE SPEED CONTROL

Vernon A. Roach, Oakland, Calif., assignor of one-half to Glenn B. Osborne

Application November 18, 1946, Serial No. 710,624

22 Claims. (Cl. 103—19)

This invention relates to apparatus for automatically controlling the rotational speed of an engine in response to variations in the output pressure of a pump driven by said engine or in response to changes in fluid pressure in a conduit supplied by said pump and due to the selective opening or closing of one or more valves or other outlets associated with the conduit.

An object of the invention is to provide control apparatus of the character described which is sensitive to an unusual degree and which will effect instant response of the pump driving engine to compensate for pressure changes in the fluid being conveyed by the pump.

Another object of the invention is to provide a control unit of the character described which is adapted to independently maintain the output pressure of one or more pumps.

A further object of the invention is to provide, in a control unit of the type referred to, a plurality of separate fluid-receiving chambers cooperative with motion-producing elements of the unit which are so isolated one from the other that intermixing of the fluids in the chambers and consequently in the supply lines associated therewith is prevented even though leaks should develop permitting escape of liquid from one or both chambers.

A still further object of the invention is to provide, in a control unit of the nature referred to, simple and readily adjustable means for conditioning the unit to function at given line pressures and for balancing the operative elements of the unit to compensate for the inherent motion resistance of the throttle or other speed control apparatus of the pump driving engine or motor.

It is another object of the invention to provide, in a control device of the class described, a lever system capable of operation under the influence of a unidirectionally applied force to successively accelerate and decelerate a variable speed motor associated therewith.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawings.

Figure 1:
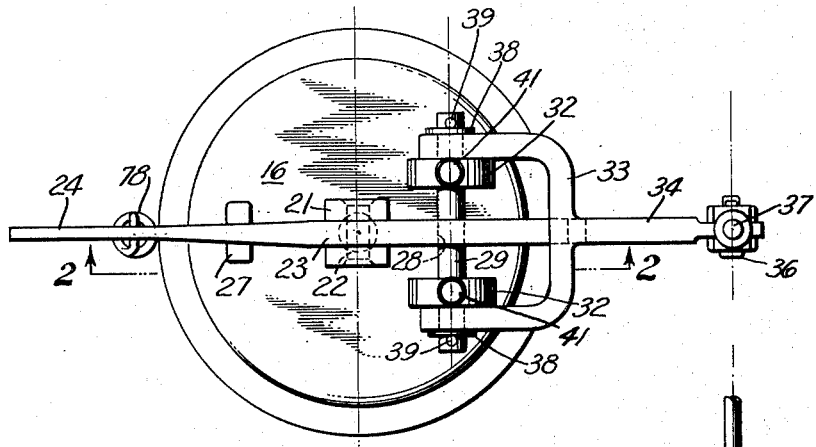
Figure 1 is a top plan view of the control unit of my invention.

In the form of my invention which I have chosen for illustration, I show a duplex control unit capable of governing and stabilizing the pressures in the discharge lines 6 of separate pumps 7 coupled together in any suitable manner, such as by a gear or chain drive mechanism indicated by the numeral 8, to be simultaneously motivated by a common engine or motor 9 which is capable of being regulated to vary its rotational speed by means of a movable throttle element exemplified by the lever 11. It may be stated here and will be apparent as the description of the invention proceeds, that the control unit is capable of functioning with either a multiple pump installation or with a single pump as may be desired. In many industrial installations, it is essential that the pressures and consequently the rate of flow of liquids in supply ducts, represented by the conduits 6 of Figure 3, be maintained at a constant value regardless of fluctuating dispensing demands occasioned, for instance, by the opening or closing of one or more valves contained in the line. For example, with the engine 9 set at a given speed, a certain pressure will be produced by a pump 7 in its discharge line 6. However, if a valve associated with the line is opened, the line pressure will drop depending upon the degree of opening of the valve. In order to restore the original pressure in the line, it is necessary therefore to increase the engine speed. Conversely, when such a pressure restoration has been established, closing of the valve will cause the line pressure to rise and in order to compensate for this, the engine must be decelerated to reduce the line pressure to the desired normal value. When such pressure fluctuations occur in rapid succession, it is obviously a next-to-impossible task to manually control the engine speed to keep abreast of them.

I have provided a simple and compact control unit which is responsive to line pressure fluctuations and which will instantly cause an automatic acceleration or deceleration, as the case may be, of the pump driving engine so as to maintain the desired working pressure in the supply line. As an example of structure accomplishing the objectives of my invention, I provide a support here shown as an upper cup-shaped housing 12 having a circular peripheral flange 13 at its lower end and an internally-extending axially-vertical stem 14 projecting downwardly from the housing top wall 16. The stem 14 is formed with an axial bore 17 providing a sliding guide for a plunger 18 which extends through the top wall 16 and is pivotally attached by means of a pin 19, or its equivalent, to a connector link 21 which is, in turn, pivotally attached by means of a pin 22, or the like, to a rocker arm 23 intermediate the ends of the latter. The rocker arm 23 on one side of its substantial medial point, represented by the pin 22, is extended in an upwardly inclined or curved arm 24 provided with a plurality of spaced apertures 26 whose function will be later explained. A fixed fulcrum here shown as a lug 27 rising from the top wall 16 of the housing, underlies and engages the rocker arm at a point substantially intermediate the pivot pin 22 and the first of the series of apertures 26. The portion of the rocker arm extending in an opposite direction from the pivot pin 22 is provided with an axially horizontal aperture 28 in which is rotatably received a pivot axle 29 longitudinally extended on each side of the rocker arm to pass through vertically elongated slots 31 formed in parallel relatively spaced tongues 32 rising from the top wall 16 of the housing. The distal extremities of the pivot axle 29 are extended through suitable apertures formed in the clevis arms 33 of a lever 34 to the outer end of which is pivotally attached, by means of the pivot pin 36, an end of a link 37, the other end of which is similarly pivotally connected to the throttle lever 11. Washers 38, fitted to the extremities of the pivot axle and retained thereon by cotter pins 39, or other equivalent elements, retain the pivot axle in position; and stop elements which may be in the form of screws 41 entering the upper ends of the slots 31, through threaded apertures provided in the tongues 32, are adapted to engage and adjustably limit the upward movement of the pivot axle in the slots. Jamb nuts 42, or their equivalent, are provided with the screws 41 for securing the latter in position. Cooperative relationship between the lever 34 and the rocker arm 23 is established by a distal extension 43 of the latter which underlies and engages the lever at a point spaced radially outwardly from the center of movement of the lever represented by the axis of the pivot axle. The articulated lever and rocker arm structure is employed primarily for the purpose of providing separate movement of the lever 34 when advancement of the engine throttle, independently of movement thereof by the rocker arm, is desired. Aside from this, it will of course be seen that the rocker arm and lever may be constructed as a rigid integral unit if such arrangement is desired.

Means is provided, responsive to fluctuations in pressure in a pump discharge line 6 for moving the plunger 18 and consequently the rocker arm and its associated parts so as to vary the degree of opening or closing of the engine throttle or control element. Overlying the lower open end of the housing 12 and the flange 13 is a flexible, disk-shaped upper diaphragm 44 having an aperture formed at its center through which passes an extension 46 of the plunger 18, connection between the extension and diaphragm being effected by washers 47 which clamp the diaphragm therebetween and which are secured in place by a collar 48 or equivalent element pressed on or otherwise secured to the plunger extension 46. The peripheral margin of the upper diaphragm 44 is overlaid by a transaxial face of an annular spacer 49, the lower parallel face of which provides a seating surface for the peripheral margin of an intermediate flexible diaphragm 51 spaced below the upper diaphragm a distance equivalent to the axial thickness of the spacer 49 and defining the lower member of a fluid-receiving chamber 52. A port 53 opening through the spacer ring 49 is provided with a threaded portion 53 for receiving one end of a conduit 54, the other end of which is in communication with one of the pump discharge lines 6. Fluid from the line 6 may thus enter the chamber 52. An additional spacer ring 56 is provided underlying the peripheral margin of the intermediate diaphragm 51, the lower transaxial face of the ring forming a seating surface for the peripheral margin of a lower diaphragm 57 which is structurally similar to the diaphragms 44 and 51. The diaphragms 51 and 57 together with the spacer ring 56 enclose a chamber 58 which is vented to the atmosphere through an aperture 59 provided in the spacer ring. Overlying the peripheral margin of the lower diaphragm 57 is the rim 61 of an upwardly opening cup-shaped cap 62, the internal recess of which, in association with the lower surface of the diaphragm 57, provides an enclosed chamber 63 having a port 64, connected to one end of a conduit 66 communicating with a separate discharge line 6 of another pump, through which fluid from the latter discharge line may enter the chamber 63. The lower and intermediate diaphragms 57 and 51 are each provided with central apertures through which passes a rod member 67, axially aligned with the plunger 18, engaging the lower end thereof and having a head 68 at its upper end forming a stop for one of a pair of clamp washers 69, associated with the intermediate diaphragm, which are secured in place by a collar 71 or its equivalent mounted on a medial portion of the rod member. The lower end of the collar 71 forms a stop for a pair of clamping washers 72 associated with the lower diaphragm and secured in place by a collar or nut 73 attached to the lower extremity of the rod member. Normally, the lower end of the collar or nut 73 rests against the bottom wall of the chamber 63 so as to support the lower diaphragm above the latter wall. Means securing the various superposed elements together, and consequently clamping the diaphragms in place, is provided in a plurality of elongated screws 74 having heads overlying the rim 61, passing through suitable apertures formed in the margins of the diaphragms, spacing rings and the said rim 61 and threadedly engaged in tapped holes provided in the housing flange 13.

Means yieldably holding the rocker arm 23 in engagement with the fulcrum lug 27 and the pivot axle 29 in engagement with the lower end of each slot 31 is provided in a coil spring 76 within the housing 12, the spring being concentric with the plunger 18 and the stem 14 and being interposed between the inner surface of the top wall 16 and the confronting uppermost washer 47. The spring 76 is stressed so as to exert an expansive force downwardly so as to cause the diaphragms 44, 51 and 57 to assume normal downwardly flexed positions and to retain the rocker arm as aforesaid. The strength and compression characteristics of the spring 76 depend on the maximum operating pressures which may be established in the chambers 52 and 63. The lever 34 is held in downward retraction against the rocker arm extension 43 by the spring 77 or other recoil element associated with the throttle lever 11. A rocker arm holding spring 78 is provided, being positioned exteriorly of the housing 12 and having its opposite ends threadedly or otherwise engaged with a lug 81 projecting radially from one of the spacer rings 49 or 56, and in one of the apertures 26 of the arm 24. The multiple aperture arrangement in the rocker arm for securing the upper end of the spring 78 is for the purpose of varying the effective force of the latter spring with respect to the effective force of the engine throttle lever spring 77 as will be presently more fully explained.

Figures 2, 3:
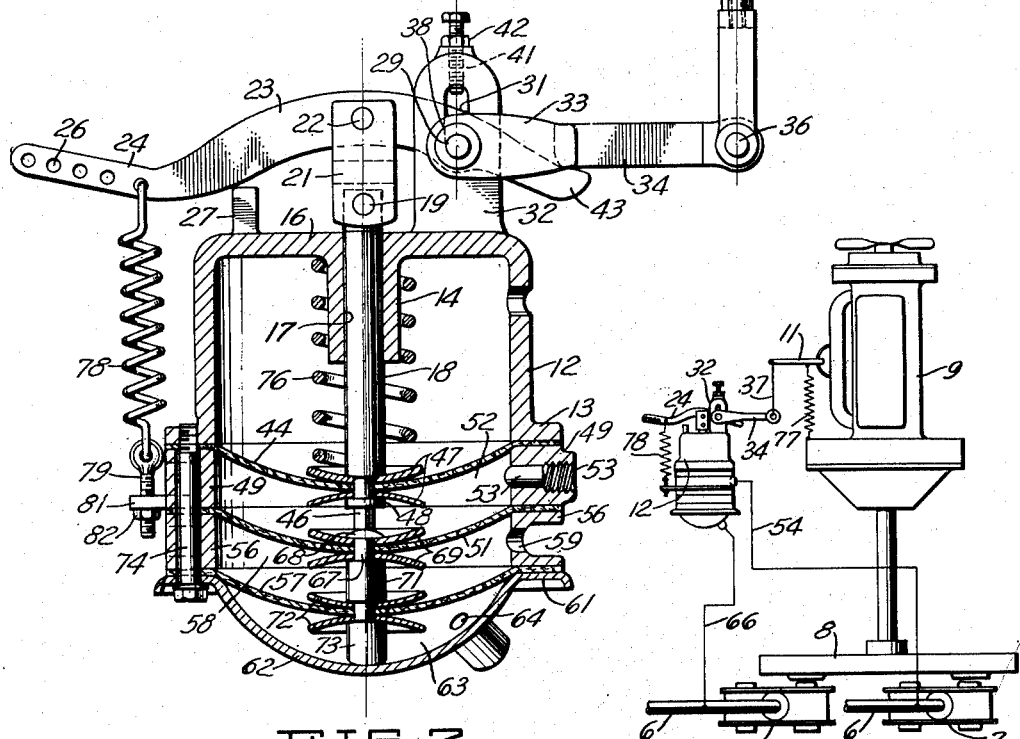
Figure 2 is a vertical sectional view of the control unit taken in the plane indicated by the line 2—2.
Figure 3 is a top plan view showing the relationship of the control unit of my invention to an engine and the pumps driven thereby.
Figure 4:
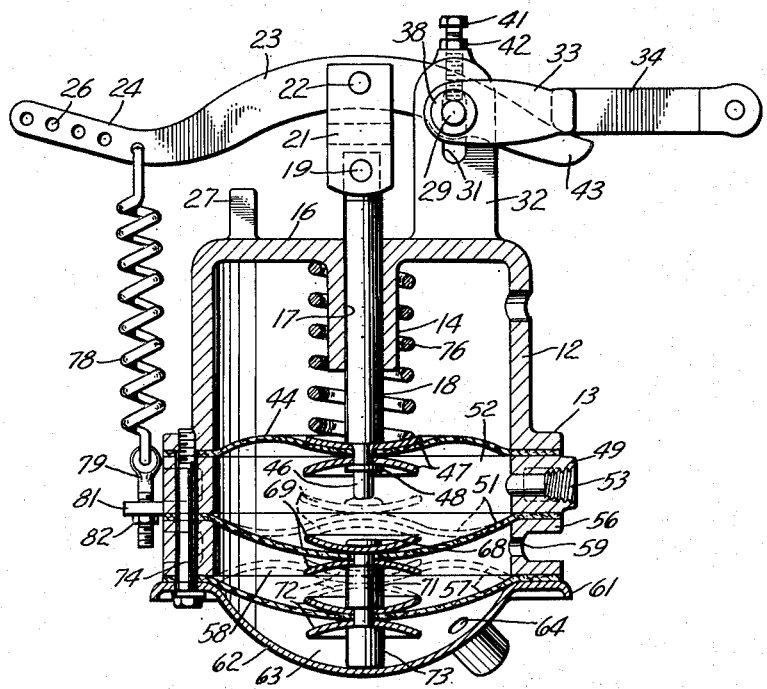
Figure 4 is a view, similar to Figure 2, showing the operative parts of the control unit in the positions of balance they occupy in holding the speed of the pump driving engine to a given value to produce a predetermined pressure output from the pumps.

When the engine 9 is inactive and no pressure exists in the pump discharge lines 6, the parts of the control unit will assume positions as shown in Figure 2. However when the engine is started, the actuated pumps will build up pressure in the lines and consequently fluid at a corresponding pressure will be admitted to the chambers 52 and 63. In order to simplify the description at this point it will be assumed that the unit is adapted for control of a single pump and that fluid under pressure may enter only the chamber 52. When the engine 9 is started, the activation of the pump will cause a rapid advance in pressure in the discharge line 6, the supply line 66 and the chamber 52. When the pressure in the chamber 52 is great enough to overcome the effective combined resistance of the springs 76 and 77 to the extent that such resistance is not offset by the spring 78, the diaphragm 44 will be flexed upwardly, as shown by the full lines of Figure 5. This will cause a corresponding upward movement of the plunger 18, assisted somewhat by the spring 78, which will primarily tilt the rocker arm 23 about a fulcrum represented by the point of repose of the latter arm on the lug 27 and will cause the pivot axle 29 to ascend in the slots 31. These movements will cause an upward swing of the lever 34, due to its interengagement with the rocker arm, to progressively open the throttle of the engine and consequently increase the rotational speed of the latter. This, of course, will further increase the pressure in the chamber 52 and continue the upward movements of the rocker arm and lever 34 until such movement is stopped, here shown as being effected when the pivot axle 29 impinges against and is restrained from further upward movement by the stop screws 41. When this condition obtains, the lever 34 will be in its ultimate advanced position and consequently the engine throttle will be opened to a maximum degree. However, as the pressure in the chamber 52 continues to build up, the fulcrum of the rocker arm 23 will now be transferred to the upward movement stop element or pivot axle 29 which, as the rocker arm continues its upward movement under the sustained push of the plunger 18, will allow a reversal of movement of the lever 34 permitting the latter to move downwardly and correspondingly close the engine throttle. It will be seen therefore that during the described primary action of the automatic control device during initial pressure increase at the pump outlet, the rocker arm and lever 34 function as rigidly interconnected and integral elements and that during subsequent inverse or clockwise movement of the rocker arm about the secondary fulcrum 29 effect movement of the control throttle toward retracted position, and the appended claims are to be construed with this consideration in mind. Such decrease in throttle opening will cause a diminishing of pressure increase in the chamber 52 until a desired maximum therein is reached which may be limited in a manner well known in the art by the application of a suitable variable pressure by-pass apparatus to the pump. When such pressure balance is reached in the chamber 52, the rocker arm will have assumed a position substantially as shown in Figure 4 wherein its fulcrum will reside in the pivot axle 29. At this point it will be well to explain that the spring 78 possesses sufficient downward pull to overcome the pull of the throttle spring 77 tending to move the pivot axle downwardly out of contact with the stop screws 41 by tilting the rocker arm about a fulcrum represented by the pin 22. This same superior force of the spring 78 exists during the upward swing of the rocker arm and causes the arm to maintain firm contact with the lug 27 until the fulcrum function is transferred to the opposite end of the arm here represented by the pivot pin 29. The series of apertures 26 provided in the upwardly inclined or curved arm 24 is for the purpose of obtaining a varying degree of primary extension in the spring 78 to compensate for varying sizes or strength of throttle springs 77 which may be encountered in different installations. Further tensioning of the spring, to provide for adjustments intermediate those afforded by the apertures 26, may be secured by tightening or loosening the nut 82 associated with the eye-bolt 79.

Figure 5:
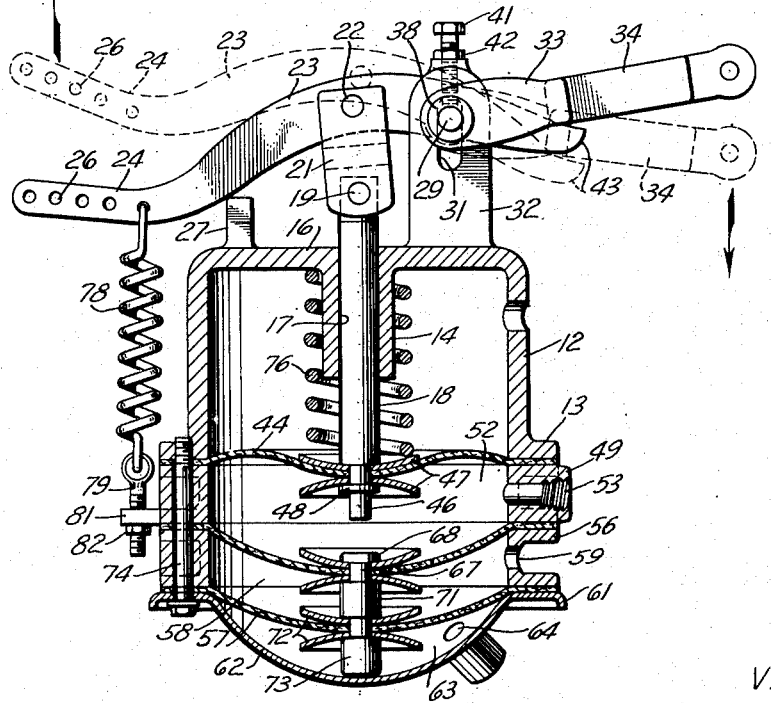
Figure 5 is a view, similar to Figure 2, showing, in exaggerated condition, the positions of the operative parts when an increase or decrease of pressure occurs in one of the control unit fluid chambers.

It will be apparent from the foregoing that when a pump is actuated to build up pressure in the fluid distribution line, and correspondingly in one of the chambers 52 or 63, the throttle or control element of the driving engine will be advanced to full open position in a comparatively short period of time since only upward axial thrust of the plunger 18 sufficient to overcome the resistances of the springs 76 and 77 will be required to swing the rocker arm 23 through its primary cycle increment of full throttle-opening movement. However, when the rocker arm reaches its aforesaid position, the substitution of fulcrums will bring the spring 78 into play, as shown in Figure 4, to augment the spring 76 in resisting the upward movement of the diaphragm and the plunger 18. Thus after the rocker arm has come into its secondary cycle increment range, one boundary of which is indicated by the illustration of Figure 5, it will require a much greater fluid pressure in the chamber to effect further upward movement of the plunger than previously was the case. This means that the rocker arm will comparatively slowly rise from the primary fulcrum or lug 27 until the pressure in the chamber reaches that value at which the distribution line is to be operated, the engine speed being stabilized at this pressure by the rocker arm-controlled positioning of the lever 34 to effect the proper throttle setting. It will therefore be seen that while the unit passing through its primary cycle increment, the response of the throttle lever 11 is directly proportional to the increase in fluid pressure, but upon passing into its secondary cycle increment, the throttle lever movement is retarded and becomes inversely proportional to pressure variations. In this way the sensitivity of the device is modified and the undesirable condition known as "hunting" wherein the throttle lever oscillates after being moved to a new position in subsequent operation of the driving engine in response to pressure changes, is entirely obviated.

If the pressure in the chamber 52 should drop occasioned, let us assume, by an increased opening of an outlet valve or by the opening of additional outlet valves in the pump discharge line 6, the diaphragm 44 will be immediately flexed downwardly as illustrated in Figure 5, thus causing the rocker arm to move, as is shown in exaggeration by the full lines of the view, to swing the lever 34 upwardly and accelerate the engine until the pressure in the chamber again builds up to reestablish the rocker arm balance as shown in Figure 4. On the other hand, if the pressure in the chamber 52 should suddenly increase above the prescribed line pressure due, for example, by the partial closing of an outlet valve or by the full closing of one or all additional valves in the line, the rocker arm will be tilted upwardly toward the position indicated by the dotted lines of Figure 5 to effect downward movement of the lever 34 and throttle down the engine until the pressure-influenced equilibrium position of the rocker arm is again established. It will thus be seen that the response of the control unit to changing line pressures is instantaneous and will, within the capabilities of the engine to accelerate or decelerate, correspondingly bring the line pressure back to normal following any fluctuations thereof.

It will be seen that the admittance of fluid under pressure into the lower chamber 63 will also affect operation of the control unit either in conjunction with or independently of the control effected by pressure conditions in the chamber 52. As long as the pressure in the upper chamber 52 is superior to that in the lower chamber 63, the functions of movement of the rocker arm and its associated apparatus will be assumed by the upper diaphragm 44. However should the pressure in the lower chamber rise to the point where it exceeds that of the upper chamber, the upward flexing of the interconnected diaphragms 51 and 57 will be transmitted through the fluid in the chamber 52 to the upper diaphragm 44 and thence to the rocker arm to create operational movements as hereinbefore described. In the event that the upper chamber 52 is not being used, the motion caused by pressure rise in the lower chamber will be transmitted to the plunger 18 by the engagement of the latter with the upper end of the rod member 67. It will be evident therefore that regardless of the relative positions of the diaphragms 44 and 57, the former may move independently of the other to effect control movements of the rocker arm, while the latter diaphragm may move to modulate the movements of the upper diaphragm as is indicated by the dotted lines of Figure 4.

As has been pointed out, in the operation of getting into the regulating range, the response of throttle lever 11 is at first directly proportional to variations in fluid pressure and is subsequently inversely proportional to these variations. However, when the engine is stopped, or in some suitable manner de-clutched from the pump, the pressure beneath the diaphragms in chambers 52 and 63 is decreased, and the rocker arm 23 and the associated linkage first responds in a manner to open the throttle to the peak of the regulating range, then the fulcrums are, in effect, switched back, wherein lug 27 acts as the fulcrum for rocker arm 23 and the rocker arm pivots on this lug until it is restored to its starting or no-pressure condition as illustrated in Figure 2. Thus in stopping the engine, the response of throttle lever 11 is at first inversely proportional to variations in fluid pressure and is subsequently directly proportional to these variations, which is the reverse sequence to that of starting the engine.

It will also be seen that I provide a safety feature in the control unit which prevents intermixture of the fluids contained in the respective chambers 52 and 63. In many instances the materials handled by the pumps 7 are of such nature that even a slight trace of one substance in the other will render the contaminated substance commercially unsalable. If a single diaphragm were provided separating the chambers 52 and 63 a slight leak in the diaphragm would allow fluid from one chamber to pass into the other. However, since I provide a double diaphragm structure separating the fluid chambers, a leak in one or both diaphragms will not create serious damage since the intermixed discharge may pass to the exterior of the unit through the vent opening 59 where it will be promptly discovered and remedied.

It will be further seen that although I have shown the rocker arm and its associated parts movable under the influence of pressure applied to the diaphragms, it is entirely within the scope of my invention to adapt the lever mechanism to an engine speed governor which may be powered by the application of the pressure of an operator's foot or hand imposed on a throttle member associated and movable with the plunger 18. Thus as illustrated in the lever positions of Figure 5, the engine may be accelerated to a maximum degree of throttle opening, as indicated by the full line positions of the rocker arm and lever, whereupon further advancement of the plunger representative of additional foot or hand pressure on the throttle member will decelerate the motor from its maximum speed as indicated by the positions of the elements shown in dotted lines.

I claim:

1. In combination with a pump driven by a variable speed engine provided with a speed governing throttle, speed control apparatus comprising a member connected with and to control movement of said speed governing throttle between retracted and advanced positions, means responsive to variations in pressure at the outlet of said pump and connected with said member to move the latter proportionately to said variations, and means cooperative with said member during movement of the first-mentioned means in one direction for controlling movement of said throttle toward alternate speed governing positions thereof.

2. In combination with a pump driven by a variable speed engine provided with a speed governing throttle, speed control apparatus comprising an element movable in response to variations in pressure at the outlet of said pump, a member connected and operable with said element and with said throttle, said element being movable in one direction primarily to move said throttle to fully advanced position, said element being movable secondarily in the aforesaid direction to move said throttle toward retracted position, and said member when in the range of secondary movement being thereafter reciprocably movable by said element to correspondingly move the throttle alternately between advanced and retracted positions thereof.

3. In combination with a pump driven by a variable speed engine provided with a speed governing throttle, speed control apparatus comprising a housing having a chamber therein in communication with and to receive fluid under pressure from the outlet of said pump, a piston member in said chamber movable in response to fluctuations in the pressure of fluid in said chamber, a rocker arm mounted on said housing and connected with and to be moved by said piston member, said rocker arm being operatively connected with and to move said throttle between advanced and retracted positions, means on the housing engaging said rocker arm and establishing a primary fulcrum about which said rocker arm may be moved in one direction by said piston member to move the throttle toward advanced position, and means carried by said rocker arm cooperative with said housing and establishing an independent secondary fulcrum about which said rocker arm may operate, while moving in said one direction, to move the throttle toward retracted position.

4. In combination with a pump driven by a variable speed engine provided with a speed governing throttle, speed control apparatus comprising a housing having a chamber therein in communication with and to receive fluid under pressure from the outlet of said pump, a piston member in said chamber movable in response to fluctuations in the pressure of fluid in said chamber, a rocker arm connected at a point intermediate its ends with and to be moved by said piston member, said rocker arm being operatively connected with and to move said throttle between advanced and retracted positions, means engaging said rocker arm at a point thereon lying to one side of the point of connection of the rocker arm with the piston member to establish a primary fulcrum about which said rocker arm may be moved in one direction to move the throttle toward advanced position, and means engageable by the rocker arm during movement thereof by the piston member in said one direction and at a point thereon lying to the other side of the point of connection of the rocker arm with the piston member to establish an independent secondary fulcrum about which said rocker arm may operate, while moving in said one direction, to move the throttle toward retracted position.

5. In combination with a pump driven by a variable speed engine provided with a speed governing throttle, speed control apparatus comprising a housing having a chamber therein in communication with and to receive fluid under pressure from the outlet of said pump, a piston member in said chamber movable in response to fluctuations in the pressure of fluid in said chamber, a rocker arm connected at a point intermediate its ends with and to be moved by said piston member, said rocker arm being operatively connected with and to move said throttle between advanced and retracted positions, means on the housing engaging said rocker arm at a point thereon lying to one side of the point of connection of the rocker arm with the piston member to establish a primary fulcrum about which said rocker arm may be moved in one direction to move the throttle toward advanced position, means engageable by the rocker arm during movement thereof by the piston member in said one direction and at a point thereon lying to the other side of the point of connection of the rocker arm with the piston member to establish an independent secondary fulcrum about which said rocker arm may operate, while moving in said one direction, to move the throttle toward retracted position, and said means engageable by the rocker arm and establishing the secondary fulcrum limiting the movement of the rocker arm about said primary fulcrum.

6. In combination with a pump driven by a variable speed engine provided with a speed governing throttle, speed control apparatus comprising a housing having a chamber therein in communication with and to receive fluid under pressure from the outlet of said pump, a piston member in said chamber movable in response to fluctuations in the pressure of fluid in said chamber, a rocker arm connected at a point intermediate its ends with and to be moved by said piston member, said rocker arm being operatively connected with and to move said throttle between advanced and retracted positions, means engaging said rocker arm at a point thereon lying to one side of the point of connection of the rocker arm with the piston member to establish a primary fulcrum about which said rocker arm may be moved in one direction to move the throttle toward advanced position, means engageable by the rocker arm during movement thereof by the piston member in said one direction and at a point thereon lying to the other side of the point of connection of the rocker arm with the piston member to establish an independent secondary fulcrum about which said rocker arm may operate, while moving in said one direction, to move the throttle toward retracted position, said means engageable by the rocker arm and establishing the secondary fulcrum limiting the movement of the rocker arm about said primary fulcrum to move the throttle toward advanced position, and means for adjustably positioning said secondary fulcrum establishing means relative to said rocker arm.

7. In combination with a pump driven by a variable speed engine provided with a speed governing throttle, speed control apparatus comprising a housing having a chamber therein in communication with and to receive fluid under pressure from the outlet of said pump, a piston member in said chamber movable in response to fluctuations in the pressure of fluid in said chamber, a rocker arm connected at a point intermediate its ends with and to be moved by said piston member, said rocker arm being operatively connected with and to move said throttle between advanced and retracted positions, means engaging said rocker arm at a point thereon lying to one side of the point of connection of the rocker arm with the piston member to establish a primary fulcrum about which said rocker arm may be moved in one direction to move the throttle toward advanced position, first means resisting movement of said rocker arm about the primary fulcrum, means engageable by the rocker arm during movement thereof in said one direction and at a point thereon lying to the other side of the point of connection of the rocker arm with the piston member to establish an independent secondary fulcrum about which said rocker arm may operate, while moving in said one direction, to move the throttle toward retracted position, said first movement resisting means being operative with said rocker arm when said throttle is being moved toward retracted position, and second means operative after establishment of said secondary fulcrum for yieldably resisting movement of the throttle toward said retracted position thereof, said second throttle movement resisting means augmenting said first throttle movement resisting means only after establishing of said secondary fulcrum.

8. In combination with a pump driven by a variable speed engine provided with a speed governing throttle, speed control apparatus comprising a housing having a chamber therein in communication with and to receive fluid under pressure from the outlet of said pump, a piston member in said chamber movable in response to fluctuations in the pressure of fluid in said chamber, a rocker arm connected at a point intermediate its ends with and to be moved by said piston member, said rocker arm being operatively connected with and to move said throttle between advanced and retracted positions, means engaging said rocker arm at a point thereon lying to one side of the point of connection of the rocker arm with the piston member to establish a primary fulcrum about which said rocker arm may be moved in one direction to move the throttle toward advanced position, a first spring operatively interposed between said housing and rocker arm for yieldably resisting movement of the rocker arm about the primary fulcrum, means engageable by the rocker arm during movement thereof in said one direction and at a point thereon lying to the other side of the point of connection of the rocker arm with the piston member to establish an independent secondary fulcrum about which said rocker arm may operate, while moving in said one direction, to move the throttle toward retracted position, said first spring being operative with the rocker arm when the throttle is being moved toward retracted position, a second spring operative after establishment of said secondary fulcrum for yieldably resisting movement of the throttle toward said retracted position thereof, said second spring augmenting said first spring only after establishment of said secondary fulcrum and means for variably adjusting the resistance of said second spring.

9. In combination with a pump driven by a variable speed engine provided with a speed governing throttle, speed control apparatus comprising a housing having a chamber therein in communication with and to receive fluid under pressure from the outlet of said pump, a piston member in said chamber movable in response to fluctuations in the pressure of fluid in said chamber, a rocker arm connected with and to be moved by said piston member, said rocker arm being operatively connected with and to move said throttle between advanced and retracted positions, a fulcrum lug on which said rocker arm may rest and providing a primary fulcrum about which the rocker arm may be moved in one direction by said piston member to move the throttle toward advanced position, an independent secondary fulcrum about which the rocker arm may operate, while moving in said one direction to move the throttle toward retracted position, means defining the position of said secondary fulcrum, a first spring operatively interposed between the rocker arm and housing for resisting movements in one direction of said rocker arm about the primary and secondary fulcrums, and a second spring operatively interposed between the rocker arm and housing for resisting movement in another direction of the rocker arm about the secondary fulcrum.

10. In combination with a pump driven by a variable speed engine provided with a speed governing throttle, speed control apparatus comprising a housing having a chamber therein in communication with and to receive fluid under pressure from the outlet of said pump, a piston member in said chamber movable in response to fluctuations in the pressure of fluid in said chamber, a rocker arm mounted on said housing and connection with and to be moved by said piston member, said rocker arm being operatively connected with and to move said throttle between advanced and retracted positions, fulcrum lug rising from said housing on which said rocker arm may rest and providing a primary fulcrum about which the rocker arm may be moved in one direction by said piston member to move the throttle toward advanced position, an ear rising from said housing in spaced relation to said fulcrum lug, a pivot axle carried by said rocker arm and slidably engaged with said ear, stop means on said ear engageable by said pivot axle when said rocker arm is moved in said one direction to establish an independent secondary fulcrum about which the rocker arm may operate, while moving in said one direction to move the throttle toward retracted position, said stop means being adjustable relative to said ear for variably positioning the secondary fulcrum relative to the rocker arm, a first spring operatively interposed between the rocker arm and housing for resisting movements of said rocker arm about the primary and secondary fulcrums, and a second spring operatively interposed between the rocker arm and housing for resisting movement of the rocker arm about the secondary fulcrum.

11. In combination with a pump driven by a variable speed engine provided with a speed governing throttle, speed control apparatus comprising a housing having a chamber therein in communication with and to receive fluid under pressure from the outlet of said pump, a piston member in said chamber movable in response to fluctuations in the pressure of fluid in said chamber, a rocker arm mounted on said housing and connection with and to be moved by said piston member, said rocker arm being operatively connected with and to move said throttle between advanced and retracted positions, fulcrum lug rising from said housing on which said rocker arm may rest and providing a primary fulcrum about which the rocker arm may be moved in one direction by said piston member to move the throttle toward advanced position, an ear rising from said housing in spaced relation to said fulcrum lug, a pivot axle carried by said rocker arm and slidably engaged with said ear, stop means on said ear engageable by said pivot axle when said rocker arm is moved in said one direction to establish an independent secondary fulcrum about which the rocker arm may operate, while moving in said one direction to move the throttle toward retracted position, a first spring operatively interposed between the rocker arm and housing for resisting movements of said rocker arm about the primary and secondary fulcrums, a second spring operatively interposed between the rocker arm and housing for resisting movement of the rocker arm about the secondary fulcrum, and means for variably positioning said second spring relative to the rocker arm.

12. In combination with a plurality of pumps driven by a variable speed engine provided with a speed governing throttle, speed control apparatus comprising a housing having separate chambers therein each of which is in communication with and to receive fluid under pressure from a pump, piston members in said chambers movable in response to fluctuations in the pressure of fluid in said chambers, a plunger mounted for movement in said housing and operatively connected with and to be moved by one of said piston members, means carried by another piston member engageable with said plunger to move the latter, a rocker arm operatively engaged intermediate its ends with and to be moved by said plunger, said rocker arm having adjacent one end thereof a series of relatively spaced attachment elements and having adjacent the other end thereof a pivot axle, a fulcrum lug rising from said housing and engaging said rocker arm adjacent the end thereof carrying said attachment elements to provide a primary fulcrum for the rocker arm, means carried by said rocker arm connected with and to move said throttle upon movement of the rocker arm, said rocker arm upon movement of said plunger being movable about said primary fulcrum to move said throttle toward advanced position, a first spring operative with said plunger to resist movement of the throttle toward advanced position, an ear rising from said housing and having a guide thereon in which said pivot axle is slidable, a stop element associated with said guide engageable with said pivot axle during movement of said rocker arm to establish a secondary fulcrum about which said rocker arm may move during said movement thereof in one direction to move the throttle toward retracted position, a second spring secured at one end to said housing and having an opposite end thereof selectively engageable in one of the series of attachment elements of said rocker arm, and means for variably positioning said stop element relative to said guide for adjustably locating the position of said secondary fulcrum relative to said housing.

13. In combination with a pump driven by a variable speed engine provided with a speed governing throttle, speed control apparatus comprising an element movable in response to variations in pressure of the fluid delivered by said pump, a movable member connected and operable with said element and with said throttle, said element being movable in one direction in response to an increase in the pressure of said fluid to move said member and said throttle toward an advanced position, said element being further movable in the same direction in response to an additional increase in pressure of said fluid, and means engageable by said member during movement thereof in response to said additional increase in pressure for changing the direction of movement of the member and for retracting said throttle from advanced position.

14. In combination with a pump driven by a variable speed engine provided with a speed governing throttle, speed control apparatus comprising an element movable in response to variations in pressure of the fluid delivered by said pump, a movable member connected and operable with said element and with said throttle, said element being movable in one direction in response to an increase in the pressure of said fluid to move said member and said throttle in direct proportion to movement of said element, toward an advanced position, said element being further movable in the same direction in response to an additional increase in pressure of said fluid, and means engageable by said member during movement thereof in response to said additional increase in pressure for changing the direction of movement of the member and for retracting said throttle in inverse proportion to movement of said element from said advanced position.

15. In combination with a pump driven by a variable speed engine provided with a speed governing throttle, speed control apparatus comprising a support and including a housing having a chamber therein in communication with and to receive fluid under pressure from the outlet of said pump, a displaceable member in said chamber movable in response to fluctuations in the pressure of fluid in said chamber, a rocker arm on said support and connected with and to be moved by said displaceable member, said rocker arm being operatively connected with and to move said throttle between advanced and retracted positions in response to movement of said displaceable member, fixed means engaging said rocker arm and establishing a primary fulcrum about which said rocker arm may be moved in one direction by said displaceable member to move the throttle toward advanced position, and independent fixed means positioned in the path of movement of said rocker arm and engageable therewith upon movement of the rocker arm about said primary fulcrum in said one direction for establishing a secondary fulcrum about which the rocker arm may operate in a reverse direction, during further movement of the displaceable member in said one direction to retract said throttle from advanced position thereof.

16. In combination with a pump driven by a variable speed engine provided with a speed governing throttle, speed control apparatus comprising a support and including a housing having a chamber therein in communication with and to receive fluid under pressure from the outlet of said pump, a displaceable member in said chamber movable in response to fluctuations in the pressure of fluid in said chamber, a rocker arm on said support and connected with and to be moved by said displaceable member, said rocker arm being operatively connected with and to move said throttle between advanced and retracted positions in response to movement of said displaceable member, fixed means engaging said rocker arm and establishing a primary fulcrum about which said rocker arm may be moved in one direction by throttle toward advanced position, and independent fixed means positioned in the path of movement of said rocker arm and engageable therewith upon movement of the rocker arm about said primary fulcrum in said one direction for establishing a secondary fulcrum about which the rocker arm may operate in a reverse direction and at a modified ratio with respect to said displaceable member during further movement of the displaceable member in said one direction to retract said throttle from advanced position thereof.

17. In a control apparatus, a support, an arm mounted for rocking movement on said support, actuating means connected with said arm and movable to correspondingly move the arm, control means connected with said arm and movable therewith in response to movements of said actuating means, means providing a primary fulcrum on said support, said primary fulcrum being engageable with said arm during movement of the latter and around which said arm, actuating means and control means may primarily move correspondingly, and a secondary fulcrum on said support engageable by said arm during said primary movement thereof for imparting a reverse secondary movement to the arm while the actuating means subsequently moves in the direction of primary movement thereof.

18. A speed control apparatus adapted for controlling the speed of a variable speed prime mover which has a speed governor element movable between retracted and advanced positions and which prime mover is adapted to drive a pump, said control apparatus comprising a member adapted to be connected with and to move said governor element between relatively retracted and advanced positions, means adapted to respond to variations in pressure at the outlet side of said pump and connected with said member to move the latter proportionately to said variations, and means cooperating with said member during movement of the first mentioned means in one direction for controlling movement of said governor successively toward alternate speed governing positions thereof.

19. In control apparatus for correlating advancement or retraction of the speed control throttle of an engine connected with and to drive a pump, a lever member connected in one end portion thereof with and to govern movement of said throttle, actuating means movable in response to variations in pressure at the pump outlet and connected with said lever member in a medial portion thereof for moving said lever member correspondingly to said pump pressure variations, separate first and second fulcrum elements fixedly positioned adjacent said lever member, said first fulcrum element being releasably engaged with an opposite end portion of said lever member whereby said lever member is moved by said actuating means about said first fulcrum element during initial increase of pump outlet pressure to advance said control throttle, and said second fulcrum element being engageable with said lever member at a point intermediate the positions of engagement with the latter of said actuating means and control throttle whereby upon subsequent movement of said actuation means in response to an increase in pump outlet pressure said lever member will be rocked about said second fulcrum element to effect retraction of said control throttle.

20. In control apparatus for correlating advancement or retraction of the speed control throttle of an engine connected with and to drive a pump, a lever member connected in one end portion thereof with and to govern movement of said throttle, actuating means movable in response to variations in pressure at the pump outlet and connected with said lever member in a medial portion thereof for moving said lever member correspondingly to said pump pressure variations, separate first and second fulcrum elements fixedly positioned adjacent said lever member, said first fulcrum element being releasably engaged with an opposite end portion of said lever member whereby said lever member is moved by said actuating means about said first fulcrum element during initial increase of pump outlet pressure to advance said control throttle, auxiliary pressure means connected with said lever member and operative upon movement of the latter about said first fulcrum element to facilitate movement of said control throttle toward an advanced position, said second fulcrum element being engageable with said lever member at a point intermediate the positions of engagement with the latter of said actuating means and control throttle whereby upon subsequent movement of said actuation means in response to an increase in pump outlet pressure said lever member will be rocked about said second fulcrum element to effect retraction of said control throttle, and said auxiliary pressure means being operative during rocking movement of the lever member about said second fulcrum element to resist movement of said control throttle toward a retracted position.

21. In control apparatus for correlating advancement or retraction of the speed control throttle of an engine connected with and to drive a pump, an actuating element connected with and reciprocably movable in response to variations in pressure at the outlet of said pump, a lever member operatively interposed between said control throttle and actuating element and movable in response to movements of the latter, means detachably engageable with said lever member for confining initial movement of the latter in response to movement of the actuating element under an increase in pressure at the pump outlet to advance said control throttle, and means engageable with said lever member during said initial movement thereof for effecting inverse movement of a portion of the lever member in respect to progressive movement of the actuating element in response to an additional increase in pressure at the pump outlet for controlling retraction of said control throttle.

22. In control apparatus for correlating advancement or retraction of the speed control throttle of an engine connected with and to drive a pump, and actuating element connected with and reciprocably movable in response to variations in pressure at the outlet of said pump, a lever member operatively interposed between said control throttle and actuating element and movable in response to movements of the latter, means detachably engageable with said lever member for confining initial movement of the latter in response to movement of the actuating element under an increase in pressure at the pump outlet to advance said control throttle, and variably positionable means engageable with said lever member during said initial movement thereof for effecting adjustable inverse movement of a portion of the lever member in respect to progressive movement of the actuating element in response to an additional increase in pressure at the pump outlet for controlling retraction of said control throttle.

VERNON A. ROACH.

REFERENCES CITED

The following references are of record in the file of this patent:

UNITED STATES PATENTS

| Number | Name | Date |
|---|---|---|
| 555,540 | Straub | Mar. 3, 1896 |
| 822,184 | Chamberlain et al. | May 29, 1906 |
| 910,292 | Krichbaum | Jan. 19, 1909 |
| 1,080,582 | Rateau | Dec. 9, 1913 |